(12) United States Patent
Popovich

(10) Patent No.: US 6,295,145 B1
(45) Date of Patent: Sep. 25, 2001

(54) SWITCHABLE HOLOGRAPHIC DEVICE

(75) Inventor: Milan M. Popovich, Leicester (GB)

(73) Assignee: Digilens, Inc., Sunnyvale, CA (US)

( * ) Notice: Subject to any disclaimer, the term of this patent is extended or adjusted under 35 U.S.C. 154(b) by 0 days.

(21) Appl. No.: 09/641,530

(22) Filed: Aug. 18, 2000

Related U.S. Application Data

(60) Provisional application No. 60/150,919, filed on Aug. 26, 1999.

(51) Int. Cl.[7] .................................................. G02B 5/32
(52) U.S. Cl. .............................. 359/15; 359/13; 359/24; 359/573; 345/7
(58) Field of Search .......................... 359/13, 15, 22, 359/25, 573; 349/201; 345/7, 8, 9

(56) References Cited

U.S. PATENT DOCUMENTS

| | | | |
|---|---|---|---|
| 3,807,829 | 4/1974 | Close | 350/3.5 |
| 4,759,596 | 7/1988 | Po et al. | 350/96.15 |
| 4,830,441 | 5/1989 | Chang | 350/3.7 |
| 4,856,869 | * 8/1989 | Sakata et al. | 359/573 |
| 5,014,709 | 5/1991 | Bjelkhagen et al. | 128/654 |
| 5,093,563 | 3/1992 | Small et al. | 250/201.9 |
| 5,103,323 | 4/1992 | Magarinos et al. | 359/8 |
| 5,151,724 | 9/1992 | Kikinis | 357/17 |
| 5,153,670 | 10/1992 | Jannson et al. | 356/301 |
| 5,221,957 | 6/1993 | Jannson et al. | 356/301 |
| 5,227,898 | 7/1993 | Iavecchia et al. | 359/9 |
| 5,299,035 | 3/1994 | Leith et al. | 359/9 |
| 5,365,354 | 11/1994 | Jannson et al. | 359/15 |
| 5,418,631 | 5/1995 | Tedesco | 359/15 |
| 5,471,327 | 11/1995 | Tedesco et al. | 359/15 |
| 5,506,701 | 4/1996 | Ichikawa | 359/15 |
| 5,530,565 | 6/1996 | Owen | 359/15 |
| 5,535,024 | 7/1996 | Khoury et al. | 359/7 |
| 5,537,232 | 7/1996 | Biles | 359/15 |
| 5,539,544 | 7/1996 | Le Paih et al. | 359/15 |
| 5,557,283 | 9/1996 | Sheen et al. | 342/179 |
| 5,581,378 | 12/1996 | Kulick et al. | 359/9 |
| 5,608,552 | 3/1997 | Smith | 349/5 |
| 5,615,186 | 3/1997 | Rosen et al. | 369/44.24 |
| 5,629,784 | 5/1997 | Abileah et al. | 349/112 |
| 5,680,231 | 10/1997 | Grinberg et al. | 359/15 |
| 5,703,702 | 12/1997 | Crane et al. | 359/1 |
| 5,721,598 | 2/1998 | Smith | 349/106 |
| 5,721,630 | 2/1998 | Horner et al. | 359/15 |
| 5,777,742 | 7/1998 | Marron | 356/359 |
| 5,796,498 | 8/1998 | French | 359/4 |
| 5,796,499 | 8/1998 | Wenyon | 359/15 |
| 5,808,759 | 9/1998 | Okamori et al. | 359/15 |
| 5,864,375 | 1/1999 | Taketomi et al. | 349/15 |

* cited by examiner

Primary Examiner—Darren Schuberg
(74) Attorney, Agent, or Firm—Van Pelt & Yi LLP

(57) ABSTRACT

A switchable holographic device generally comprises a substrate having two generally opposed surfaces and a plurality of holographic fringes recorded in the substrate. The holographic fringes are configured to switch between active and passive states upon application of an electrical field. One or more of the plurality of holographic fringes are positioned such that a surface of the fringe is angled relative to one of the substrate surfaces. The holographic device further comprises a pair of electrodes each positioned generally adjacent to one of the substrate surfaces and operable to apply an electrical field to the fringes to switch the fringes between their active and passive states. One of the pair of electrodes has a plurality of independently controlled segments. Each of the segments is positioned over an area of the substrate having holographic fringes positioned within a common range of angles relative to the substrate surface.

27 Claims, 5 Drawing Sheets

SWITCHABLE HOLOGRAPHIC DEVICE

RELATED APPLICATIONS

The present application claims the benefit of U.S. Provisional Application Ser. No. 60/150,919 filed Aug. 26, 1999.

BACKGROUND OF THE INVENTION

The present invention relates generally to holographic devices, and more particularly, to a switchable hologram.

Switchable holograms are often formed from polymer-dispersed liquid crystal (PDLC) material which have holographic fringes recorded therein. During the recording process, the PDLC material undergoes a phase separation thereby creating fringes, which include regions densely populated by liquid crystal micro-droplets interspersed with regions of clear polymer. The liquid crystal material is interposed between electrodes so that an electrical field can be applied to the hologram. When an electrical field is applied to the hologram, the natural orientation of the liquid crystal droplets is changed, causing the refractive index modulation of the fringes to reduce and the hologram diffraction efficiency to drop to a very low level, thereby effectively erasing the hologram.

Volume holograms (also known as thick or Bragg holograms) provide high diffraction efficiencies for incident light beams having wavelengths close to the theoretical wavelength satisfying the Bragg diffraction condition, and which are within a few degrees of the theoretical angle that also satisfies the Bragg diffraction condition. Experimental evidence shows that the magnitude of the electric field required to switch these holograms between their active (diffracting) state and passive (non-diffracting) state is dependent upon the slant angle of the holographic fringes, which is defined as the angle between the Bragg surface of the fringes and a normal to the hologram surface.

In applications in which a hologram is required to operate over a wide range of incidence angles, such as with an eyepiece in an off-axis wearable display device, there is likely to be significant variation in the slant angle over the area of the hologram. When an electric field of a predetermined magnitude is applied to the hologram, there may be areas in which the slant angle prevents the hologram from switching (i.e., the switching threshold due to the slant angle is higher than the applied field). Under these circumstances, the hologram will only be partially erased.

The magnitude of the electric field may be increased to overcome this problem. However, there may be other areas within the hologram which are then exposed to excessively high voltages (i.e., areas where the switching threshold due to the slant angle is significantly below the applied voltage). This may cause electrical breakdown, delamination, or other effects that result in irreversible damage to the hologram.

SUMMARY OF THE INVENTION

A switchable holographic device generally comprises a substrate having two generally opposed surfaces and a plurality of holographic fringes recorded in the substrate. The holographic fringes are configured to switch between active and passive states upon application of an electrical field. One or more of the plurality of holographic fringes are positioned such that a surface of the fringe is angled relative to one of the substrate surfaces. The holographic device further comprises a pair of electrodes each positioned generally adjacent to one of the substrate surfaces and operable to apply an electrical field to the fringes to switch the fringes between their active and passive states. One of the pair of electrodes has a plurality of independently controlled segments. Each of the segments is positioned over an area of the substrate having holographic fringes positioned within a common range of angles relative to the substrate surface.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
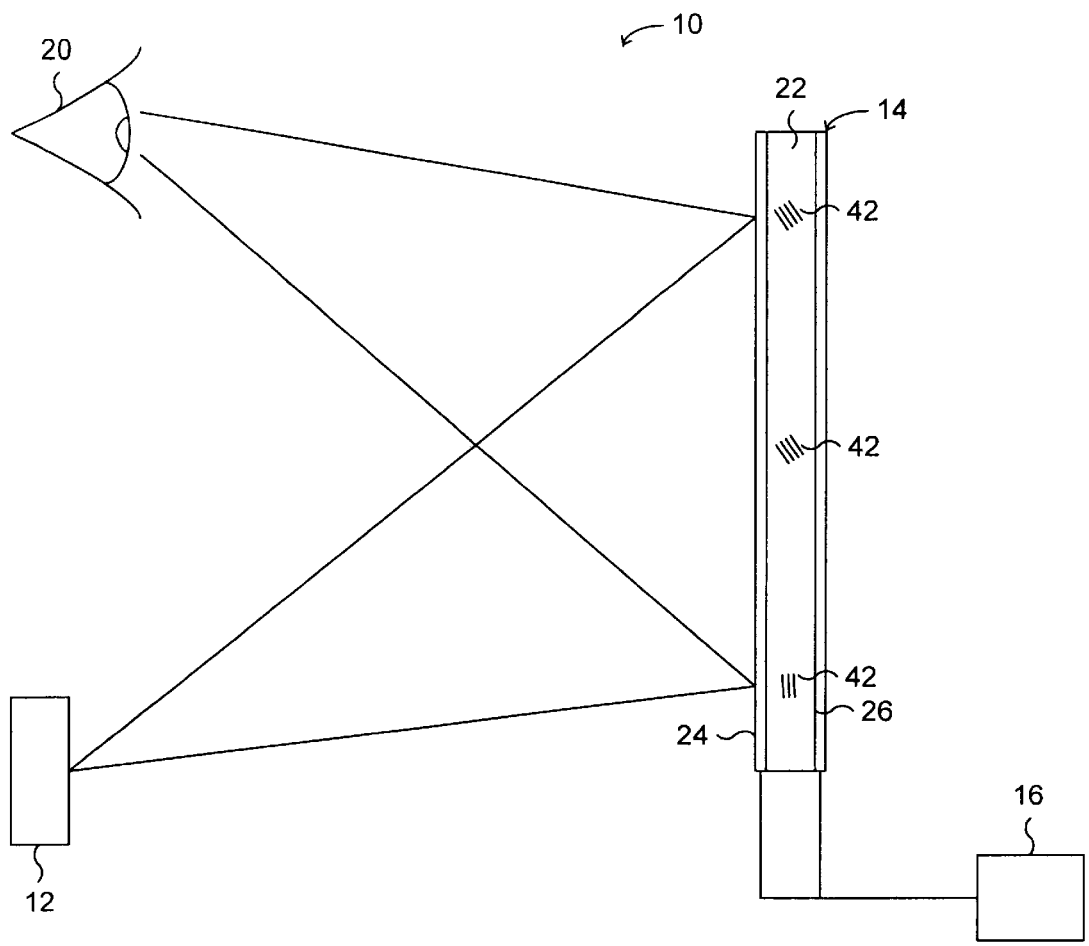
FIG. 1 is a schematic of an image viewing apparatus having a switchable hologram of the present invention.

Referring now to the drawings, and first to FIG. 1, a display system, generally indicated at 10, is shown. The system 10 includes a display device 12, a holographic device generally indicated at 14, and a controller 16. The display device 12 is operable to display an image to be viewed by an observer (eye of the observer shown at 20 in FIG. 1). The holographic device 14 includes a Bragg reflection hologram (recorded on a substrate) 22 interposed between electrodes 24, 26 coupled to the controller 16. The Bragg hologram 22 provides high diffraction efficiencies for incident beams with wavelengths close to the theoretical wavelength satisfying the Bragg diffraction condition and within a few degrees of the theoretical angle which also satisfies the Bragg diffraction condition. By varying the voltage applied across the electrodes 24, 26, the hologram 22 can be switched between an active state and a passive state, as described below.

The system 10 shown in FIG. 1 is a simplified schematic of a display system. The system 10 may include components such as lenses and mirrors or other optical components as is well known by those skilled in the art. Additional optical elements may also be provided to correct for aberrations, if required. For example, the lenses may include cylinders, prisms, and off-axis aspheric elements to correct for aberrations due to the off-axis, non-symmetric nature of the display system.

The display system 10 may be configured for use as a head mounted display. The head mounted display includes a headpiece (not shown) designed to be worn by a viewer and the display system 10 for producing wide-angle, electronically generated virtual images to one or both eyes of the viewer. The display system 10 may also be used in a narrow field of view displays. The headpiece may include a frame configured to fit over a viewer's head and a mask which fits over the viewer's eye region, as is well known by those skilled in the art. The display system may comprise left and right optical systems or only one optical system. For example, two optical systems may be used as described in U.S. patent application Ser. No. 09/405,444, filed Sept. 23, 1999, by A. Preston, to provide a variable aspect ratio system. The display system may also include a single image generator and projection system operable to project a left image to a left eye of a viewer and a right image to a right eye of the viewer as described in U.S. patent application Ser. No. 09/439,063, filed Nov. 12, 1999, by M. Popovich.

The display device 12 produces an image under control of an image generator (not shown) which may provide, for example, video or graphic information. The display device 12 may comprise a flat panel display (e.g., a reflective liquid crystal display (LCD) panel, or other spatial light modulator (SLM) which reflects light produced externally). The image display panel may be a miniature reflective LCD having either a nematic or ferroelectric material on a silicon backplane, for example. The reflective display panel utilizes an external light source to reflect and modulate light off the front of the microdisplay. The display panel may also be based on transmissive display technologies. The display device 14 may be, for example, a miniature reflective silicon backplane device, such as a SVGA (800×600 pixels) device available from Colorado MicroDisplay, of Boulder Colo. Other devices including a micro-electromechanical system, such as a Digital Light Processor (DLP) using a Digital Micromirror Device™ (DMD) available from Texas Instruments, or a diffractive display device such as a Grating Light Valve™ (GLV) available from Silicon Light Machines (formerly Echelle, Inc.), may also be used as the display device 12. It is to be understood that the display devices listed above are provided only as examples and that other types of display devices may be used without departing from the scope of the invention.

Figure 2:
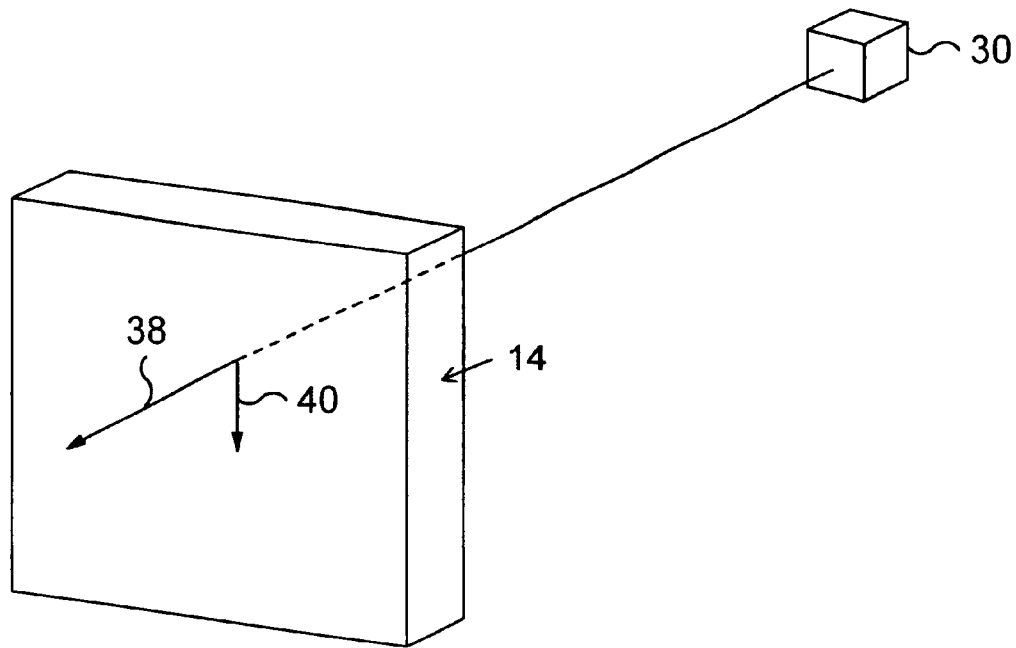
FIG. 2 is a perspective of the switchable hologram of FIG. 1 and light source.
Figure 3:
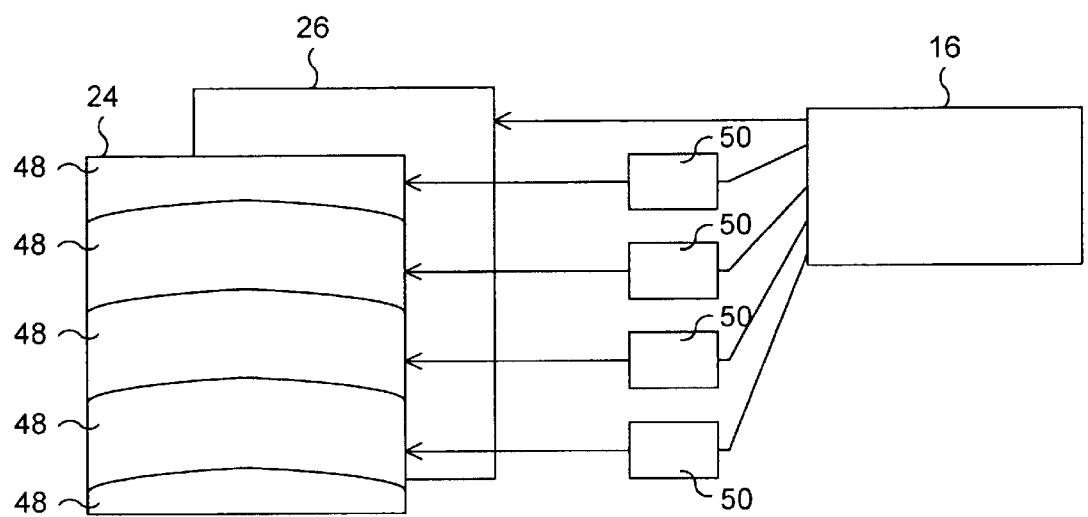
FIG. 3 is a diagram of a pair of electrodes of the switchable hologram of FIG. 2 and electronic controllers.

As previously described and shown in FIGS. 1 and 2, the holographic device 14 includes hologram 22 interposed between a pair of electrodes 24, 26. The hologram 22 is used to control transmitted light beams based on the principles of diffraction. The hologram selectively directs an incoming light beam from light source 30 either towards or away from a viewer and selectively diffracts light at certain wavelengths into different modes in response to a voltage applied to the electrodes 24, 26 (FIGS. 2 and 3). Light passing through the hologram in the same direction that the light is received from the light source 30 is referred to as the zeroth (0th) order mode 38. When no voltage is applied to the electrodes 24, 26, liquid crystal droplets within the holographic device 14 are oriented such that the hologram is present in the element and light is diffracted from the zeroth order mode to a first (1st) order mode 40 of the hologram. When a voltage is applied to the holographic optical element 14 the liquid crystal droplets become realigned effectively erasing the hologram, and the incoming light passes through the holographic device in the zeroth order mode 38.

It is to be understood that the holographic device 14 may also be reflective rather than transmissive. In the case of a reflective holographic optical clement, the arrangement of the holographic device and optical components would be modified to utilize reflective properties of the hologram rather than the transmissive properties described herein.

The light that passes through the hologram 22 is diffracted to form an image by interference fringes 42 recorded in the hologram (FIGS. 1 and 2). Depending on the recording, the hologram 22 is able to perform various optical functions which are associated with traditional optical elements, such as lenses and prisms, as well as more sophisticated optical operations which would normally require very complex systems of conventional components. The hologram 22 may be configured to perform operations such as deflection, focusing, filtering or aberration correction.

The holograms 22 are preferably recorded on a photopolymer/liquid crystal composite material (emulsion) such as a holographic photopolymeric film which has been combined with liquid crystal, for example. The presence of the liquid crystal allows the hologram 22 to exhibit optical characteristics which are dependent on an applied electrical field. The photopolymeric film may be composed of a polymerizable monomer having dipentaerythritol hydroxypentacrylate, as described in PCT Publication, Application Ser. No. PCT/US97/12577, by Sutherland et al., which is incorporated herein by reference. The liquid crystal may be suffused into the pores of the photopolymeric film and may include a surfactant.

The diffractive properties of the holographic device 14 depend primarily on the recorded holographic fringes 42 in the photopolymeric film. The holographic fringes 42 may perform a variety of diffractive optical functions such as focusing the image towards the observer's eye. The interference fringes 42 may be created by applying beams of light to the photopolymeric film. Alternatively, the interference fringes 42 may be artificially created by using highly accurate laser writing devices or other replication techniques, as is well known by those skilled in the art. The holographic fringes 42 may be recorded in the photopolymeric film either prior to or after the photopolymeric film is combined with the liquid crystal. In the preferred embodiment, the photopolymeric material is combined with the liquid crystal prior to the recording. In this preferred embodiment, the liquid crystal and the polymer material are pre-mixed and the phase separation takes place during the recording of the hologram, such that the holographic fringes 42 become populated with a high concentration of liquid crystal droplets. This process can be regarded as a "dry" process, which is advantageous in terms of mass production of the switchable holographic device 14.

The electrodes (electrode layers) 24, 26 are positioned on opposite sides of the substrate 22 and are preferably transparent so that they do not interfere with light passing through the hologram. The electrodes 24, 26 may be formed from a vapor deposition of Indium Tin Oxide (ITO) which typically has a transmission efficiency of greater than 80%, or any other suitable substantially transparent conducting material. The transmission efficiency of the electrodes 24, 26 can be improved to greater than 97% by applying multilayer anti-reflection coatings. The electrodes 24, 26 are connected to an electric circuit operable to apply a voltage to the electrodes, to generate an electric field (FIG. 3). Initially, with no voltage applied to the electrodes 24, 26, the hologram 22 is in its diffractive (active) state and the holographic device 14 diffracts propagating light in a predefined manner. When an electrical field is generated in the hologram 22 by applying a voltage to the electrodes 24, 26 of the holographic device 14, the operating state of the hologram switches from its diffractive state to its passive (inactive) state and the holographic optical element does not optically alter the propagating light. As further described below, at least one electrode 24 comprises a plurality of independently operable segments 48. Each segment 48 is controlled by a separate segment controller 50 which is in turn controlled by controller 16.

The holographic device 14 may also be formed on curved substrates, as described in U.S. patent application Ser. No. 09/416,076, by M. Popovich, filed Oct. 12, 1999.

Figure 4:
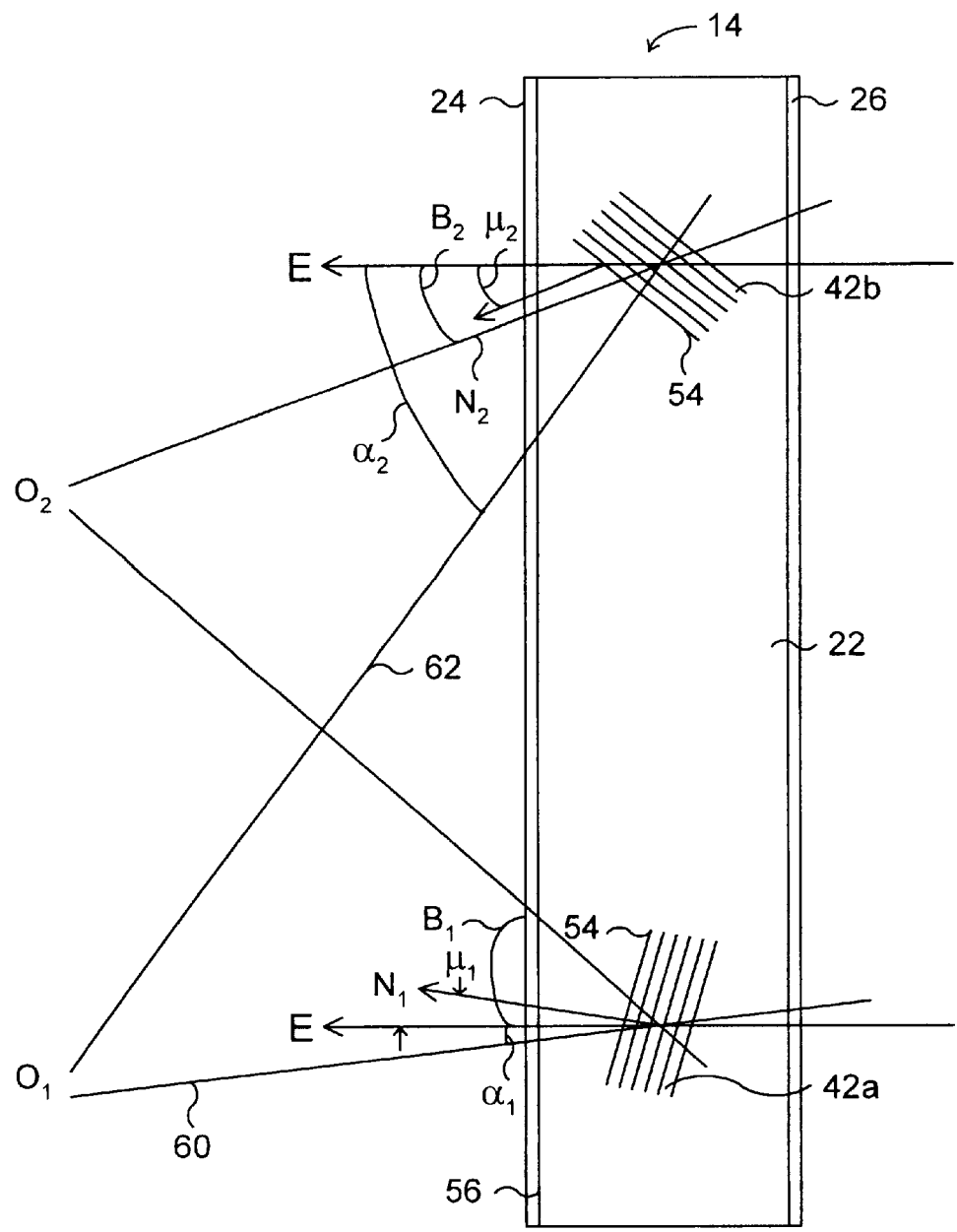
FIG. 4 is a schematic illustrating slant angles of holographic fringes of the switchable hologram of FIG. 2.

FIG. 4 is an enlarged side view of the holographic device 14 of FIG. 1 showing additional detail of the holographic fringes 42 recorded in the hologram 22. Point $O_1$ represents an image displayed on the display device 12 and point $O_2$ represents a conjugate point at which an image of the object is formed by the hologram 22 (FIGS. 1 and 4). Because the points $O_1$ and $O_2$ are located off-axis, light rays passing from the object to the conjugate point are incident upon the hologram 22 at a wide variety of angles. The inclination of the fringes 42 at any given point in the hologram 22 is uniquely determined by the beam geometry at that point, as is well known by those skilled in the art of optics. The inclination will therefore vary based upon the light incidence angle. There is generally a progressive change in the inclination of the fringes 42 from the bottom to the top of the hologram 22, as viewed in FIG. 4.

A slant angle $\mu$ is defined as the angle between a vector N which is normal to a Bragg surface 54 of the fringe and a vector E which is normal to the surface 56 of the hologram (or substrate) 22. The vector E generally corresponds to a vector of the electric field applied between the electrodes. As shown in FIG. 4, a light ray 60 emitted from the object point $O_1$ is incident upon a lower portion of the hologram at an angle $\alpha_1$ and is diffracted at an angle $\beta_1$ by fringes 42a having a relatively small slant angle $\mu_1$. In contrast, a light ray 62 emitted from the point $O_1$ is incident upon an upper portion of the hologram 22 at an angle $\alpha_2$ and is diffracted at an angle $\beta_2$ by fringes 42b having a larger slant angle $\mu_2$. As shown in FIG. 4, angles, $\alpha$, $\beta$, and $\mu$ are all measured relative to the vector E normal to the surface 56 of the hologram 22. It should be noted that the slant angles $\mu_1$, $\mu_2$ shown in FIG. 4 are exaggerated for ease of illustration and that the effects of refraction between the holographic medium 22 and the surrounding air have not been taken into account.

The invention has been described above with respect to a reflection hologram. The Bragg surfaces of reflection holograms tend to be generally parallel with the hologram surface (i.e., an unslanted fringe will have a slant angle of 0°). The above described invention may also be applied to transmission holograms, in which case the Bragg surfaces 54 tend to be generally perpendicular to the hologram (i.e., slant angle of unslanted fringe will be 90°).

The magnitude of the threshold voltage required to switch a hologram 22 between its active and passive states becomes larger as the thickness of the hologram (substrate) increases, and the optimum switching voltage is very sensitive to small fluctuations in the hologram thickness. Experimental evidence shows that the threshold voltage varies with the slant angle $\mu$. As a consequence, a voltage that is sufficient to switch the fringes 42a may be below the threshold level for the fringes 42b, resulting in only partial erasure of the hologram. On the other hand, a voltage that is sufficient to switch the fringes 42b may be sufficiently above the threshold for the fringes 42a such that it causes damage to the hologram 22.

Figure 5:
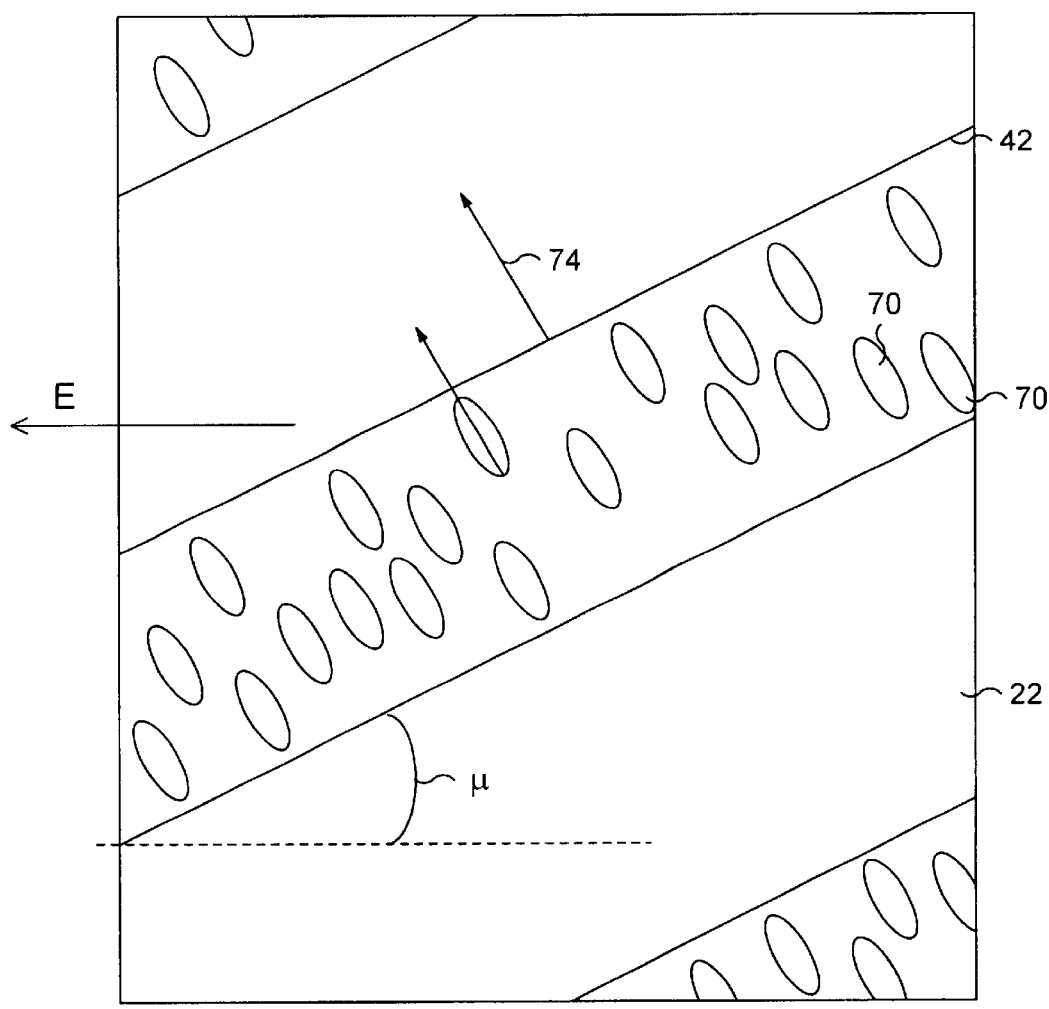
FIG. 5 is a schematic illustrating an exemplary disposition of liquid crystal droplets within the switchable hologram of FIG. 2.

One possible explanation for this effect is illustrated in the schematic of FIG. 5. The liquid crystal droplets 70 which form the hologram fringes 42 are asymmetric in shape and tend to have their long axes aligned parallel to the grating vector (indicated at 74 in FIG. 5) of the fringes. In order to erase the fringes 42, it is necessary to deform the liquid crystal molecules contained in the droplets 70 such that the average index of the droplets matches that of the surrounding holographic medium 22. The molecules are typically aligned parallel to the long axis of the droplet in the case of a transmission hologram. The response of a given droplet 70 to the electrical field applied to the electrodes appears to be a function of the angle of the liquid molecules contained in the droplet relative to the field vector E. Consequently, the switching voltage required to deform the droplet 70 can also be expected to vary with this angle, and therefore, also with the slant angle $\mu$ of the fringes 42.

The above-described effect depends upon whether the hologram 22 is reflective or transmissive. In the case of a reflection hologram (such as shown in FIG. 4), the Bragg surfaces 54 are generally perpendicular to the intended direction of electric field application. The PDLC material may have negative dielectric anisotropy, such that the liquid crystal molecules contained in the droplets 70 tend to rotate to align in a direction perpendicular to the field direction when an electric field is applied. The molecules in the droplets 70 thus switch from a state in which the molecules are aligned substantially normal to the Bragg surfaces to a state in which they are perpendicular to the applied field in order to effect switching of the hologram 22. In the case of a transmission hologram, the PDLC material has positive anisotropy such that the liquid crystal molecules, which are typically aligned parallel to the long axis of the liquid crystal droplets 70 tend to the become aligned parallel to the field direction when an electric field is applied.

Another possible explanation (although less likely) is that the slant angle $\mu$ of the fringes 42 may give rise to small variations in thickness of the hologram 22. In particular, the concentration of liquid crystal droplets 70 (i.e., the number of droplets per unit length in the direction of the applied electric field) will change with the slant angle $\mu$. This is likely to alter the compressibility of the material in a direction perpendicular to the hologram surface 56, and may also affect shrinkage, which tends to take place in the same direction.

It is to be understood that there may be other explanations for the above-described effect, however, regardless of the explanation, the present invention may be used to overcome this effect, as described below.

In order to obviate problems associated with this effect, the electrode 24 is divided into a plurality of independently operable segments 48, as shown in FIG. 3. Each of these segments 48 extends over a portion of the hologram in which the slant angle $\mu$ lies within a common predetermined range. The range can be determined experimentally by making measurements of switching voltage against slant angle for a set of test holograms. Alternatively, it may be possible to develop a mathematical model which relates switching voltage to the molecular deformation characteristics of liquid crystal droplets. The model would take into account factors such as the shape of the droplet, the refractive index, the concentration of the droplets, the polymer material, additional materials such as surfactants and photoinitiators, etc. [See, for example, the theory published by WU [see B -G Wu, J H Erdmann and J W Doan "Response times and voltages for PDLC light shutters" Liq. Cryst. 5, pp 1453–1465 (1989)] which may provide a basis.]

Each of the segments 48 is connected to individual segment controllers 50 so that the voltage applied to the electrode segments varies from one segment to the next. This voltage difference is designed in each case to be above the switching threshold for the respective portion of the hologram 22 while not being so high as to run the risk of causing damage to the hologram. The actual voltage applied to each segment 48 can be determined experimentally or by means of a mathematical model which relates switching voltage to the slant angle $\mu$ while taking into account all relevant material characteristics. The equations of the Bragg surface are determined by calculating the interference pattern formed by the interfering waveforms (corresponding to the image and object conjugates). The latter can be calculated from a knowledge of the optical specification of the holographic optical elements. The shapes of the wavefronts could be determined by means of optical design software such as CodeV (available from Optical Research Associates, California) or ZEMAX (available from Focus Software Inc. Tucson, Ariz.). Having determined the Bragg surface equations, it is possible to calculate iso-slant angle contours over the aperture of the hologram. The shapes of the electrodes would match the contours with the number of electrodes actually required being a compromise between complexity of the electrode structure and the number of contour sub-ranges required to give suitable "average" switching voltages within each sub range. The variation in threshold voltage may vary by 10–20%, for example. The voltage may range, for example, from 50–100V depending on thickness of the substrate 22 and orientation of fringes 42. The variation in voltage difference may be achieved by the use of electrical resistances, as is well known by those skilled in the art.

In the embodiment shown in FIG. 3, the electrode 26 extends as a single element over the entire area of the hologram 22. This electrode 26 may also be divided into a plurality of independently operable segments, each of which extends over the same portion of the hologram as a respective one of the segments 48 of the electrode 24. The required shapes of the electrode segments 48 may be determined based on the desired phase function of the hologram. It is to be understood that the number of segments 48 and shape of the segments may be different than shown herein without departing from the scope of the invention. For example, the segments 48 may be formed as concentric deformed circles or may be curved to match the contour of a lens. The number of segments 48 may vary, for example, from five to ten segments, or may be fewer or greater in number depending on the size of the hologram 22 or variation in slant angle $\mu$ of the fringes 42.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A switchable holographic device comprising:
   a substrate having two generally opposed surfaces;
   a plurality of holographic fringes recorded in the substrate and configured to switch between active and passive states upon application of an electrical field, one or more of said plurality of holographic fringes positioned such that a surface of the fringe is angled relative to one of the substrate surfaces; and
   a pair of electrodes each positioned generally adjacent to one of the substrate surfaces and operable to apply an electrical field to the fringes to switch the fringes between their active and passive states, one of said pair of electrodes having a plurality of independently controlled segments, each of the segments positioned over an area of the substrate having holographic fringes positioned within a common range of angles relative to the substrate surface.

2. The holographic device of claim 1 wherein the surface of the holographic fringe is a Bragg surface.

3. The holographic device of claim 1 wherein said common range of angles covers a range of approximately 0.5 to 5.0 degrees.

4. The holographic device of claim 1 wherein said plurality of independently controlled segments comprises between five and ten segments.

5. The holographic device of claim 1 wherein each of said plurality of segments is curved relative to an edge of said substrate.

6. The holographic device of claim 1 wherein said plurality of segments extend across the surface of the substrate.

7. The holographic device of claim 1 wherein the surfaces of the holographic fringes are angled with respect to the substrate surface between zero and forty degrees.

8. The holographic device of claim 1 further comprising an electronic controller operable to apply a different voltage to each of said independently controlled electrode segments.

9. The holographic device of claim 8 wherein a voltage difference between adjacent segments is between 10% and 20%.

10. The holographic device of claim 1 wherein the other of said pair of electrodes comprises a plurality of segments having generally the same size and shape as the segments of the corresponding electrode.

11. The holographic device of claim 1 wherein the holographic device is transmissive.

12. The holographic device of claim 1 wherein the holographic device is reflective.

13. The holographic device of claim 1 wherein the substrate is formed from a polymer and liquid crystal material.

14. A display system comprising:
   a display device operable to display an image; and
   a holographic device operable to direct said image towards a user of the system, the holographic diffraction device comprising:
      a substrate having two generally opposed surfaces;
      a plurality of holographic fringes recorded in the substrate and configured to switch between active and passive states upon application of an electrical field, one or more of said plurality of holographic fringes positioned such that a surface of the fringe is angled relative to one of the substrate surfaces; and
      a pair of electrodes each positioned generally adjacent to one of the substrate surfaces and operable to apply an electrical field to the fringes to switch the fringes between their active and passive states, one of said pair of electrodes having a plurality of independently controlled segments, each of the segments positioned over an area of the substrate having holographic fringes positioned within a common range of angles relative to the substrate surface.

15. The system of claim 14 wherein the surface of the holographic fringe is a Bragg surface.

16. The system of claim 14 wherein said common range of angles covers a range of approximately 0.5 to 5.0 degrees.

17. The system of claim 14 wherein said plurality of independently controlled segments comprises between five and ten segments.

18. The system of claim 14 wherein each of said plurality of segments is curved relative to an edge of said substrate.

19. The system of claim 14 wherein said plurality of segments extend across the surface of the substrate.

20. The system of claim 14 wherein the surfaces of the holographic fringes are angled with respect to the substrate surface between zero and forty degrees.

21. The system of claim 14 further comprising an electronic controller operable to apply a different voltage to each of said independently controlled electrode segments.

22. The system of claim 21 wherein a voltage difference between adjacent segments is between 10% and 20%.

23. The system of claim 14 wherein the other of said pair of electrodes comprises a plurality of segments having generally the same size and shape as the segments of the corresponding electrode.

24. The system of claim 14 wherein the holographic device is transmissive.

25. The system of claim 14 wherein the holographic device is reflective.

26. The system of claim 4 wherein the substrate is formed from a polymer and liquid crystal material.

27. The system of claim 14 wherein the display system is configured for use as a head mounted display.

* * * * *